United States Patent
Zhang et al.

(10) Patent No.: US 12,067,079 B2
(45) Date of Patent: Aug. 20, 2024

(54) FARMLAND REFERENCE CROP EVAPOTRANSPIRATION PREDICTION METHOD CONSIDERING UNCERTAINTY OF METEOROLOGICAL FACTORS

(71) Applicant: China Institute of Water Resources and Hydropower Research, Beijing (CN)

(72) Inventors: Baozhong Zhang, Beijing (CN); Zheng Wei, Beijing (CN); He Chen, Beijing (CN); Xin Han, Beijing (CN); Yinong Li, Beijing (CN); Taisheng Du, Beijing (CN); Zhigong Peng, Beijing (CN); Jiabing Cai, Beijing (CN); Congying Han, Beijing (CN); Yaqi Wang, Beijing (CN)

(73) Assignee: CHINA INSTITUTE OF WATER RESOURCES AND HYDROPOWER RESEARCH, Beijing (CN)

( * ) Notice: Subject to any disclaimer, the term of this patent is extended or adjusted under 35 U.S.C. 154(b) by 897 days.

(21) Appl. No.: 17/144,150

(22) Filed: Jan. 8, 2021

(65) Prior Publication Data

US 2022/0100997 A1    Mar. 31, 2022

(30) Foreign Application Priority Data

Sep. 25, 2020   (CN) .......................... 202011024366.4

(51) Int. Cl.
*G06N 3/04*      (2023.01)
*G06F 18/214*    (2023.01)
(Continued)

(52) U.S. Cl.
CPC ...... *G06F 18/214* (2023.01); *G06F 18/24155* (2023.01); *G06N 3/047* (2023.01); *G06N 3/08* (2013.01)

(58) Field of Classification Search
CPC .......... G06N 3/04; G06N 3/045; G06N 3/047; G06N 3/08; G06F 18/24155
See application file for complete search history.

(56) References Cited

U.S. PATENT DOCUMENTS

2019/0331832 A1*  10/2019  Chandra ................. G01W 1/06

FOREIGN PATENT DOCUMENTS

| AU | 2020101377 A4 | 8/2020 |
| CN | 1811306 A | 8/2006 |

(Continued)

OTHER PUBLICATIONS

Ladlani, Ibtissem, et al. "Modeling daily reference evapotranspiration (ET 0) in the north of Algeria using generalized regression neural networks (GRNN) and radial basis function neural networks (RBFNN): A comparative study." Meteorology and Atmospheric Physics 118 (2012): 163-178. (Year: 2012).*

(Continued)

*Primary Examiner* — Hal Schnee
(74) *Attorney, Agent, or Firm* — Bayramoglu Law Offices LLC

(57) ABSTRACT

A farmland reference crop evapotranspiration prediction method based on uncertainty of meteorological factors, includes: S1. acquiring a set number of groups of weather forecast data of a prediction region within a preset time period; S2. inputting each group of weather forecast data into a Bayesian probability forecast system to obtain corrected weather forecast data; and S3. inputting each group of the corrected weather forecast data into a trained RBF neural network, and predicting to obtain a farmland reference crop evapotranspiration. In the present invention, the Bayesian probability forecast system is configured to correct the weather forecast data and eliminate uncertainty of weather forecast data to obtain the accurate reference crop evapo- (Continued)

transpiration forecasted by the RBF neural network using these data.

5 Claims, 4 Drawing Sheets

(51) Int. Cl.
*G06F 18/241* (2023.01)
*G06F 18/2415* (2023.01)
*G06N 3/047* (2023.01)
*G06N 3/08* (2023.01)

(56) References Cited

FOREIGN PATENT DOCUMENTS

| | | | |
|---|---|---|---|
| CN | 101639433 | A | 2/2010 |
| CN | 101957360 | A | 1/2011 |
| CN | 102141776 | A | 8/2011 |
| CN | 103279671 | A | 9/2013 |
| CN | 103488145 | A | 1/2014 |
| CN | 103674778 | A | 3/2014 |
| CN | 104077475 | A | 10/2014 |
| CN | 104819449 | A | 8/2015 |
| CN | 106092625 | A | 11/2016 |
| CN | 106570627 | A | 4/2017 |
| CN | 106570627 | A * | 4/2017 |
| CN | 108694473 | A | 10/2018 |
| CN | 108781926 | A * | 11/2018 |
| CN | 109117599 | A | 1/2019 |
| CN | 109858093 | A | 6/2019 |
| CN | 111159149 | A | 5/2020 |
| DE | 2517943 | A1 | 11/1976 |
| GB | 633644 | A | 12/1949 |
| IN | 201941053333 | A | 12/2019 |
| KR | 101570297 | B1 | 11/2015 |
| SG | 109973 | A1 | 4/2005 |

OTHER PUBLICATIONS

Awchi, Taymoor A. "Application of radial basis function neural networks for reference evapotranspiration prediction." Al-Rafidain Engineering Journal (AREJ) 16.1 (2008): 117-130. (Year: 2008).*

Wang Yining, et al., Estimation of crop coefficient and evapotranspiration of summer maize by path analysis combined with BP neural network, Transactions of the Chinese Society of Agricultural Engineering, 2020, pp. 109-116, vol. 36, No. 7.

Fengguo Liang, et al., Reference cropping vol. prediction based on GRNN neural network, Yangtze River, 2009, pp. 58-59,103, vol. 40, No. 5.

Han Xin, et al., Prediction method of reference crop evapotranspiration considering the uncertainty of meteorological factors, Journal of China Institute of Water Resources and Hydropower Research, 2021, pp. 33-44, vol. 19, No. 1.

Zhan Guolong, Study on the Simplified Compuation and Forecasting Models of the Reference Crop Evapotranspiration, Thesis for Masters Degree Northwest A & F University, 2010, pp. 1-40.

Zhang Hai-Yong, et al., Inversion for evaporation duct using GPS signals based on improved BP neural network, Ship Science and Technology, 2015, pp. 73-77,98, vol. 37, No. 7.

Sien Li, et al., Vineyard evaporative fraction based on eddy covariance in an arid desert region of Northwest China, Agricultural Water Management, 2008, pp. 937-948, vol. 95.

Junwei Huang, et al., Modeling heat transfer properties in an ORC direct contact evaporator using RBF neural network combined with EMD, Energy, 2019, pp. 306-316, vol. 173.

* cited by examiner

FARMLAND REFERENCE CROP EVAPOTRANSPIRATION PREDICTION METHOD CONSIDERING UNCERTAINTY OF METEOROLOGICAL FACTORS

CROSS REFERENCE TO THE RELATED APPLICATIONS

This application is based upon and claims priority to Chinese Patent Application No. 202011024366.4, filed on Sep. 25, 2020, the entire contents of which are incorporated herein by reference.

TECHNICAL FIELD

The present invention relates to farmland irrigation scheduling, and in particular, to a farmland reference crop evapotranspiration prediction method considering uncertainty of meteorological factors.

BACKGROUND

Reference evapotranspiration ($ET_0$) is significant data for water resource and irrigation management, and a key indicator in water balance and irrigation scheduling. The calculation and prediction methods for $ET_0$ have become an active area in the research of water cycle and water balance in farmland ecosystems, and also play an important role in farmland irrigation systems, allocation of water and soil resources and other aspects. Thus, it is highly desirable to accurately predict crop $ET_0$ in order to better manage the water consumption of crop irrigation and improve the water efficiency of crops.

A Penman-Monteith (PM) model recommended by Irrigation and Drainage Paper No. 56 adopted by United Nations Food and Agriculture Organization (Known as FAO-56) in 1998 is a standard calculation method for calculating $ET_0$, and the PM model has a rigorous theoretical basis and substantial calculation accuracy. The global $ET_0$ has dropped significantly in the past 60 years, which is closely related to natural factors such as climate change and the like. In recent years, many $ET_0$ prediction methods have been proposed, such as a time series forecasting method, a grey prediction model and empirical equations. Since a complex non-linear relationship exists between $ET_0$ and meteorological factors, the conventional water consumption prediction model falls short in its ability to accurately predict $ET_0$ due to blindness and low fitting precision, and those predictions are easily subject to distortion.

SUMMARY OF INVENTION

With respect to the above shortcomings in the prior art, a farmland reference crop evapotranspiration prediction method considering uncertainty of meteorological factors provided by the present invention resolves a problem of low accuracy of evapotranspiration prediction due to the uncertainty of meteorological factors.

In order to achieve the above purpose of the invention, a technical solution adopted by the present invention is:
providing a farmland reference crop evapotranspiration prediction method considering uncertainty of meteorological factors, which includes:
S1. acquiring a set number of groups of weather forecast data of a prediction region within a preset time period;
S2. inputting each group of weather forecast data into a Bayesian probability forecast system to obtain corrected weather forecast data; and
S3. inputting each group of the corrected weather forecast data into a trained radial basis function (RBF) neural network, and predicting to obtain a farmland reference crop evapotranspiration.

Furthermore, a training method of the RBF neural network includes:
A1. selecting several groups of past weather data, and adopting Penman equation to calculate a reference crop evapotranspiration within a time corresponding to each group of past weather data;
A2. adopting all the past weather data and the corresponding reference crop evapotranspiration as inputs and outputs of the RBF neural network, respectively, and training the RBF neural network to obtain an initial RBF neural network model;
A3. acquiring several groups of past weather forecast data, and adopting the Penman equation to calculate a reference crop evapotranspiration within a time corresponding to each group of past weather forecast data;
A4. inputting each group of weather forecast data and the corresponding reference crop evapotranspiration in step A3 into the Bayesian probability forecast system to obtain corrected weather forecast data; and
A5. adopting the corrected weather forecast data in step A4 and the corresponding reference crop evapotranspiration as inputs and outputs of the initial RBF neural network model, respectively, and training the initial RBF neural network model to obtain a final RBF neural network.

Furthermore, a method of correcting weather forecast data of the Bayesian probability forecast system includes:
B1. calculating a prior variance of the weather forecast data, and adopting the prior variance as a diagonal element of an initial covariance matrix of the weather forecast data;
B2. calculating a covariance matrix of the weather forecast data according to the initial covariance matrix:

$$C_i = \begin{cases} C_0 & i \le t_0 \\ s_d(\text{Cov}(X_0, X_1, \ldots X_{i-1}) + s_d \varepsilon I_d) & i > t_0 \end{cases};$$

$$C_{i+1} = \frac{i-1}{i}C_i + \frac{s_d}{i}\left(\overline{iX_{i-1}X_{i-1}^T} - (i+1)\overline{X_i}\overline{X_i^T} + X_i X_i^T + \varepsilon I_d\right);$$

wherein, $C_0$ is the initial covariance matrix which is a diagonal matrix; $\varepsilon$ is a positive number between 0 and 1; $S_d$ is a scale factor having a value of $2.4^2/d$; d is a dimension of the covariance matrix; $I_d$ is a d-dimensional identity matrix; to is initial sampling frequency; X is the weather forecast data, $x_1$ is a maximum temperature, $x_2$ is a minimum temperature, $x_3$ is an average relative humidity; $x_4$ is an average relative wind speed;
$X_0$, $X_1$, $X_i$, and $X_{i+1}$ are the weather forecast data at $0^{th}$, $1^{st}$, $i^{th}$ and $i+1^{th}$ iterations, an initial value of i is 0; Cov(·) is the covariance matrix; and $\overline{X_{i-1}}$, and $\overline{X_i}$ are mean values of the weather forecast data obtained through the first i−1 and i iterations, and $X_i^T$ is a transpose of $X_i$;
B3. generating a new sample $X_i^*$ from a posterior density $N(X_i, C_i)$ of the weather forecast data, and calculating an acceptance probability $\alpha$ of the new sample $X_i^*$;

$$\alpha = \min\left\{1, \frac{f(S_n \mid X_i^*)g(X_i^*)}{f(S_n \mid X_i)g(X_i)}\right\};$$

wherein $S_n$ is a reference crop evapotranspiration; $f(S_d|X_i^*)$ is a likelihood function of $X_i^*$; $g(X_i^*)$ is a prior density of $X_i^*$; $g(X_i)$ is a prior density of $X_i$;

B4. randomly selecting a uniform random number between 0 and 1, updating $X_{i+1}=X_i^*$, if the random number is less than the acceptance probability of the new sample $X_i^*$, and letting $X_{i+1}=X_i$ if the random number is not less than the acceptance probability; and B5. determining whether $X_{i+1}$ reaching a preset precision is generated, if $X_{i+1}$ reaching the preset precision is generated, outputting $X_{i+1}$ as the corrected weather forecast data, and if $X_{i+1}$ reaching the preset precision is not generated, letting i=i+1 and returning to step B2.

The advantages of the present invention are as follows: the uncertainty of the weather forecast data can be eliminated by adopting the Bayesian probability forecast system to correct the weather forecast data, which makes the crop reference evapotranspiration predicted by the RBF neural network using these data more accurate. In this way, water is supplied more precisely according to the crop water requirement during irrigation to ensure regular growth of crops while saving water.

Compared with a traditional RBF network having the evapotranspiration with certainty forecast results, the corrected weather forecast has improved accuracy evaluation effects of the prediction results, a Nash efficiency coefficient thereof is increased by 10%, and a root mean error and a mean absolute error are reduced by 16.94% and 17.05%, respectively.

BRIEF DESCRIPTION OF THE DRAWINGS

FIG. 2(a)-FIG. 2(c) are $ET_0$ prediction results before and after correcting a maximum temperature, a relative humidity and an average wind speed, respectively, wherein FIG. 2(a), FIG. 2(b) and FIG. 2(c) are $ET_0$ prediction results before and after correcting a maximum temperature, an average wind speed and a relative humidity, respectively.

FIG. 3(a)-FIG. 3(b) are analyses for correlation of RBF and considering-uncertainty radial basis function (CU-RBF) with standard values during a modeling period and a prediction period, wherein FIG. 3(a) is the modeling period (2013-2015), and FIG. 3(b) is the prediction period (2016-2018).

FIG. 4(a)-FIG. 4(b) are the comparison of prediction values of the RBF and the CU-RBF with the standard values during the modeling period and the prediction period, wherein FIG. 4(a) is the modeling period (2013-2015), and FIG. 4(b) is the prediction period (2016-2018).

DETAILED DESCRIPTION OF THE EXEMPLARY EMBODIMENTS

Exemplary embodiments of the present invention are described below so that those skilled in the art can understand the present invention. However, it should be clear that the present invention is not limited to the scope of the exemplary embodiments. For those ordinarily skilled in the art, as long as various changes are within the spirit and scope of the present invention defined and determined by the appended claims, these changes are obvious, and all inventions using the concept of the present invention are protected.

Figure 1:
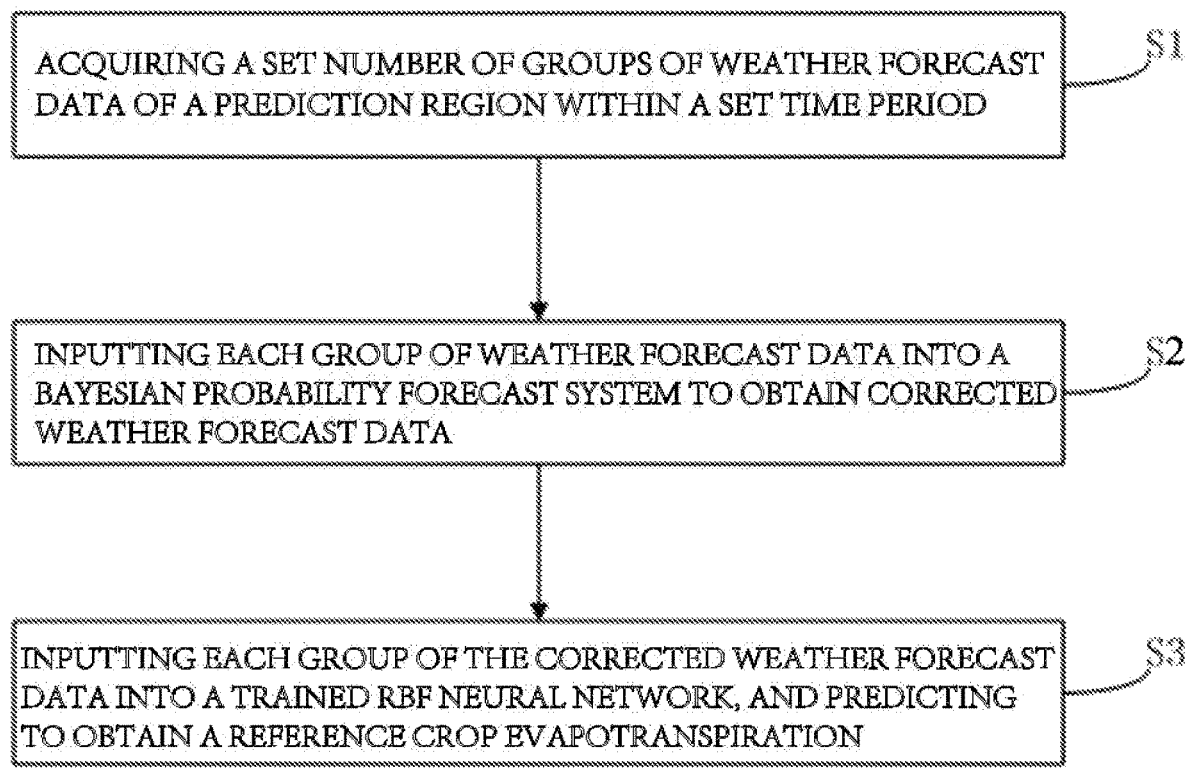
FIG. 1 is a flow chart of a farmland reference crop evapotranspiration prediction method considering uncertainty of meteorological factors.

Referring to FIG. 1 showing a flow chart of a farmland reference crop evapotranspiration prediction method considering uncertainty of meteorological factors, the method includes step S1 to step S3.

In step S1, a set number of groups of weather forecast data of a prediction region within a preset time period is acquired, wherein the weather forecast data is obtained by prediction according to measured weather data, including a maximum temperature, a minimum temperature, an average relative humidity and an average relative wind speed.

The preset time period is selected from one day, two days, three days, etc. Specifically, a group of weather forecast data is generally obtained in one day.

In step S2, each group of weather forecast data and the corresponding reference crop evapotranspiration are input into a Bayesian probability forecast system to obtain corrected weather forecast data.

In an embodiment of the present invention, a method of correcting weather forecast data of the Bayesian probability forecast system includes:

B1. calculating a prior variance of the weather forecast data (which may be performed by Microsoft Excel®), and adopting the prior variance as a diagonal element of an initial covariance matrix of the weather forecast data;

B2. calculating a covariance matrix of the weather forecast data according to the initial covariance matrix:

$$C_i = \begin{cases} C_0 & i \le t_0 \\ s_d(\text{Cov}(X_0, X_1, \ldots X_{i-1}) + s_d \varepsilon I_d) & i > t_0 \end{cases};$$

$$C_{i+1} = \frac{i-1}{i}C_i + \frac{s_d}{i}\left(\overline{iX_{i-1}X_{i-1}^T} - (i+1)\overline{X_iX_i^T} + X_iX_i^T + \varepsilon I_d\right);$$

wherein, $C_0$ is the initial covariance matrix which is a diagonal matrix; $\varepsilon$ is a positive number between 0 and 1; $s_d$ is a scale factor having a value of $2.4^2/d$; d is a dimension of the covariance matrix; $I_d$ is a d-dimensional identity matrix; $t_0$ is initial sampling frequency; X is the weather forecast data, $x_1$ is a maximum temperature, $x_2$ is a minimum temperature, $x_3$ is an average relative humidity; $x_4$ is an average relative wind speed;

$X_0$, $X_1$, $X_i$, and $X_{i+1}$ are the weather forecast data at $0^{th}$, $1^{st}$, $i^{th}$ and $i+1^{th}$ iterations, an initial value of i is 0; Cov(·) is the covariance matrix; and $\overline{X_{i-1}}$ and $\overline{X_i}$ are mean values of the weather forecast data obtained through the first i−1 and i iterations, and $X_i^T$ is a transpose of $X_i$;

B3. generating a new sample $X_i^*$ from a posterior density $N(X_i, C_i)$ of the weather forecast data, and calculating an acceptance probability $\alpha$ of the new sample $X_1^*$;

$$\alpha = \min\left\{1, \frac{f(S_n \mid X_i^*)g(X_i^*)}{f(S_n \mid X_i)g(X_i)}\right\};$$

wherein $S_m$ is a reference crop evapotranspiration; $f(S_n|X_i^*)$ is a likelihood function of $X_i^*$; $g(X_i^*)$ is a prior density of $X_i^*$; $g(X_i)$ is a prior density of $X_i$;

B4. randomly selecting a uniform random number between 0 and 1, updating $X_{i+}=X_i^*$ if the random number is less than the acceptance probability of the new sample $X_i^*$, and letting $X_{i+1}=X_i$ if the random number is not less than the acceptance probability; and B5. determining whether $X_{i+1}$ reaching a preset precision is generated, if $X_{i+1}$ reaching the preset precision is generated, outputting $X_{i+1}$ as the corrected weather forecast data, and if $X_{i+1}$ reaching the preset precision is not generated, letting i=i+1 and returning to step B2.

In step S4, each group of the corrected weather forecast data is inputted into a trained RBF neural network, and a farmland reference crop evapotranspiration is obtained by prediction.

In an embodiment of the present invention, a training method of the RBF neural network includes:

A1. selecting several groups of past weather data, and adopting Penman equation to calculate a reference crop evapotranspiration within a time corresponding to each group of past weather data;

when implemented, the Penman equation preferably selected by the embodiment is:

$$ET_0 = \frac{0.408 \times \Delta (Rn - G) + \gamma \times \frac{900}{T_{mean} + 273}) \times u_2 \times (e_s - e_a)}{\Delta + \gamma \times (1 + 0.34 \times u_2)};$$

wherein $ET_0$ is a reference crop evapotranspiration; $\Delta$ is a slope of a saturated water vapor pressure curve; Rn is a surface net radiation; G is a soil heat flux; $\gamma$ is a psychrometric constant; $T_{mean}$ is a daily average temperature on a date of each group of weather forecast data; $u_2$ and $e_a$ are a wind speed at a height of 2 meters and an actual water vapor pressure within a time corresponding to each group of weather forecast data, respectively; and $e_s$ is a saturated water vapor pressure;

A2. adopting all the past weather data and the corresponding reference crop evapotranspiration as inputs and outputs of the RBF neural network, respectively, and training the RBF neural network to obtain an initial RBF neural network model;

wherein an RBF of the RBF neural network is:

$$F(X) = \sum_{k=1}^{q} w_k \varphi_k \|X - c_k\|;$$

$$\varphi(X) = \exp\left(-\frac{X^2}{\delta^2}\right);$$

wherein, q is a number of nodes of hidden layers, i.e., an input sample size; $w_k$ is a weight factor from each node of the hidden layers to an output layer F(k); $c_k$ is a center value of a $k^{th}$ radial basis function; $\delta$ is a variable of a radial basis function; $\varphi$ is a reversible Gaussian function; $X=(x_1, x_2, x_3, x_4)$ is weather forecast data/past weather data; $x_1$ is a maximum temperature $T_{max}$, $x_2$ is a minimum temperature $T_{min}$, $x_3$ is an average relative humidity RH; and $x_4$ is an average relative wind speed Ws;

A3. acquiring several groups of past weather forecast data, and adopting the Penman equation to calculate a reference crop evapotranspiration within a time corresponding to each group of past weather forecast data;

A4. inputting each group of weather forecast data in step A3 into the Bayesian probability forecast system to obtain corrected weather forecast data; and A5. adopting the corrected weather forecast data in step A4 and the corresponding reference crop evapotranspiration as inputs and outputs of the initial RBF neural network model, respectively, and training the initial RBF neural network model to obtain a final RBF neural network.

In a training process of the RBF neural network, 444 groups of past weather data ($T_{max}$, $T_{min}$, RH and Ws) from January to December in 1981 to 2018 and monthly $ET_0$ obtained by calculation through the Penman equation are selected as a modeling set to train the RBF neural network to obtain an initial RBF neural network model.

36 groups of corrected past weather forecast data and $ET_0$ (taking a one-day prediction period as an example) data in 2013 to 2015 are selected as a modeling set to train the initial RBF neural network model to obtain a final RBF neural network.

When implemented, preferably, the RBF neural network is constructed through an RBF toolbox of matrix laboratory software (developed by MathWorks and sold under the trademark MATLAB), and a call format of the specific function is:

net=newrb(P,T,goal,spread,MN,DF);

wherein P and T are input and output variables, respectively; goal is a mean square error, goal=0.001; spread is a width of the RBF; MN is a maximum number of neurons during an artificial neural network (ANN) learning process; and DF is a number of neurons added between two displays.

Hereinafter, the results of the method for predicting the reference crop evapotranspiration of the embodiment are explained in conjunction with test examples. The impact of the correction of uncertainty of a signal meteorological factor on the $ET_0$ prediction is analyzed and explained as follows:

As for the comparison between standard values calculated using the RBF neural network and the Penman equation, there are five evaluation indicators including a decision coefficient ($R^2$), a Nash coefficient (NSE), a root mean square error (RMSE), a mean absolute error (MAE) and a relative error (RE), which are used to evaluate the performance of the RBF neural network model. The respective indicators are calculated as follows:

$$R^2 = \frac{\sum_{i=1}^{n}(x_i - \bar{x})^2 (y_i - \bar{y})^2}{\sum_{i=1}^{n}(x_i - \bar{x})^2 \sum_{i=1}^{n}(y_i - \bar{y})^2},$$

$$NSE = 1 - \frac{\sum_{i=1}^{n}(y_i - x_i)^2}{\sum_{i=1}^{n}(y_i - \bar{y})^2},$$

$$RMSE = \sqrt{\sum_{i=1}^{n} \frac{(x_i - y_i)^2}{n}},$$

$$MAE = \frac{\sum_{i=1}^{n}|x_i - y_i|}{n},$$

-continued $$RE = \frac{x_i - y_i}{n} \times 100\%;$$

where $x_i$ is a forecast value of $ET_0$; $y_i$ is a standard value of $ET_0$; $\bar{y}$ is a mean value of the standard value; i is a sequence of a forecast sample, i=1, 2, . . . , n; x and y are mean values of sequences of forecast values and calculation values; n is a number of samples of the forecast values.

Figure 2A:
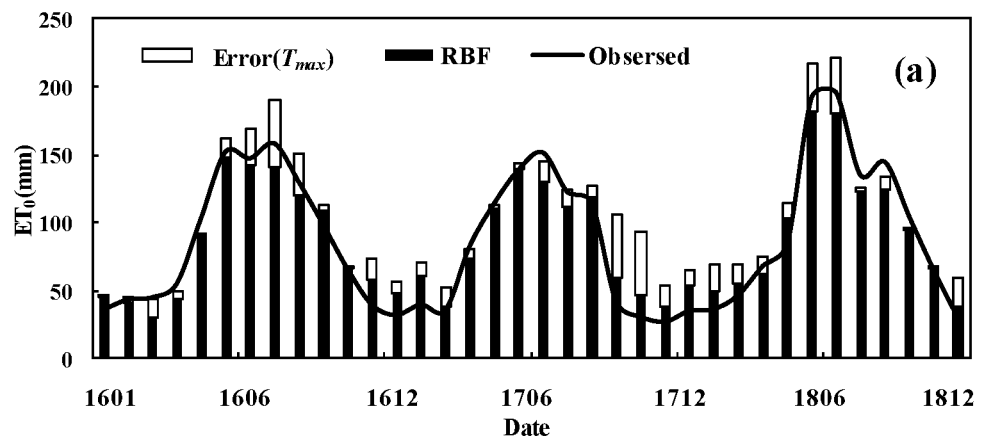
Figure 2B:
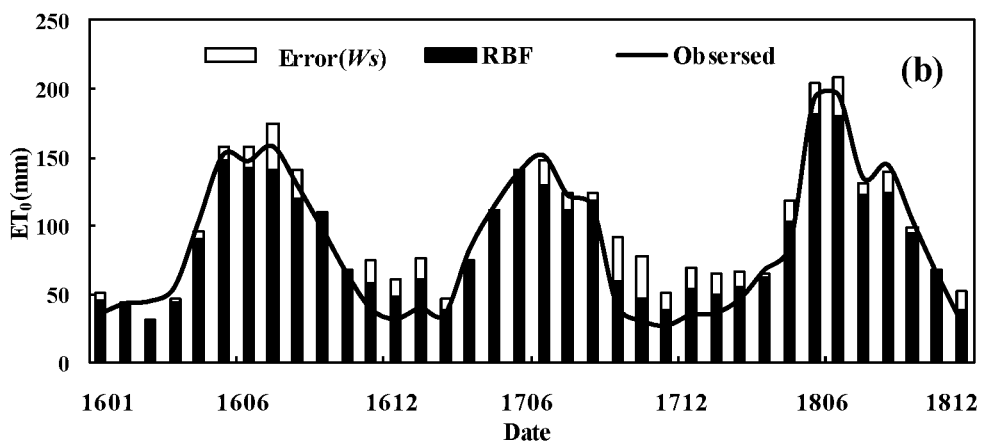
Figure 2C:
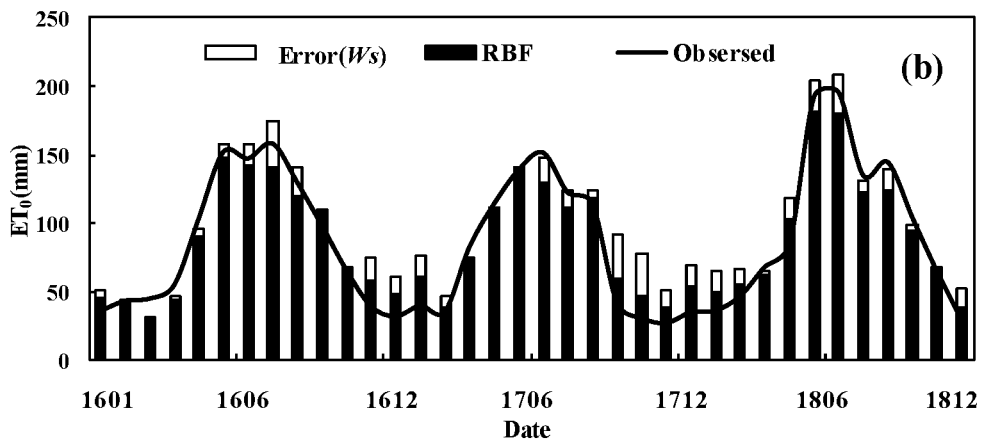

FIG. 2(a)-FIG. 2(c) and Table 1 show effects of RBF network predicting $ET_0$ after separately correcting a certain factor ($T_{max}$, Ws and RH). In FIG. 2(a)-FIG. 2(c), first two numbers in a horizontal axis represent year, and last two numbers represent month, for example, in 1602, 16 represents year 2016, and 01 represents January.

TABLE 1

$ET_0$ Prediction Effects Before and After Separately Correcting Uncertainty of Meteorological Factors

| Parameter | RBF | CU-RBF | CU-RBF$_{Tmax}$ | CU-RBF$_{Ws}$ | CU-RBF$_{RH}$ |
|---|---|---|---|---|---|
| R² | 0.89 | 0.97 | 0.93 | 0.95 | 0.90 |
| NSE | 0.90 | 0.99 | 0.91 | 0.92 | 0.90 |
| RMSE(mm) | 46.27 | 38.43 | 45.55 | 40.19 | 46.06 |
| MAE(mm) | 1.29 | 1.07 | 1.27 | 1.12 | 1.28 |
| RE (%) | 3.34 | −0.02 | 3.12 | 1.63 | 3.2 |

In Table 1, RBF represents an RBF neural network without considering uncertainty of meteorological factors while training; CU-RBF represents an RBF neural network considering uncertainty of meteorological factors in this embodiment while training; CU-RBF$_{Tmax}$ represents an RBF neural network after merely correcting uncertainty of the maximum temperature; CU-RBF$_{Ws}$ represents an RBF neural network after merely correcting uncertainty of the average wind speed, and CU-RBF$_{RH}$ represents an RBF neural network after merely correcting uncertainty of the average relative humidity.

It can be seen from FIG. 2(a)-FIG. 2(c) and Table 1 that after merely correcting $T_{max}$, a prediction value and a standard value of $ET_0$ based on an RBF model are substantially the same in a variation trend and have better effects than the RBF neural network without correction, which improves the effects of all the model evaluation parameters. R² and NSE are respectively increased by 0.04 and 0.01. RMSE, MAE and RE are respectively decreased by 0.72 mm/d, 0.02 mm/d and 0.22%. However, in comparison with the prediction model effect simultaneously considering $T_{max}$, $T_{min}$, Ws and RH, the effect is slightly worse, and NSE is decreased by 0.08.

Similarly, when separately considering corrections of Ws and RH, the prediction value and the standard value of $ET_0$ based on an RBF model are substantially the same in a variation trend and have better effects after the correction, which improves the effects of all the model evaluation parameters. R² and NSE are respectively increased by 0.06, 0.01 and 0.02, 0.01, RMSE, MAE and RE are respectively decreased by 6.08 mm/d, 0.17 mm/d, 1.71%, and 0.21 mm/d, 0.01 mm/d and 0.14%.

It can be seen from FIG. 2(a)-FIG. 2(c) that when merely correcting Ws, the prediction effect is better than those after separately correcting $T_{max}$ and RH, presumably because a wind speed is related to an underlying surface of farmlands and an observation height other than meteorological factors, and the corrected Ws can weaken the impact of external conditions on its uncertainty.

The prediction effect is worse after merely correcting RH. R² and NSE are respectively reduced by 0.05 and 0.02. RMSE, MAE and RE are respectively reduced by 5.87 mm, 0.16 mm, 1.57%, presumably because RH is directly related to rainfall, and under rainfall conditions, the uncertainty of each meteorological factor increases, and other uncorrected meteorological factors will inevitably cause prediction errors.

Secondly, the $ET_0$ prediction based on corrections of uncertainty of meteorological factors is as follows.

In the embodiment, the randomly simulated RBF prediction values corresponding to 8000 groups of $ET_0$ impact factors each month are used as a prediction set of the corresponding month, a mean value of the $ET_0$ prediction set is used as a prediction value of the month, and a confidence interval of a specified probability (85%) is given to implement $ET_0$ prediction considering uncertainty of respective impact factors, i.e., based on the impact of the input uncertainty of the RBF model on the uncertainty of the $ET_0$ forecast (CU-RBF).

Specifically, the years from 2013 to 2015 are a modeling period, the years from 2016 to 2018 are a forecast period (prediction period), please refer to FIGS. 3(a)-3(b) and 4(a)-4(b) showing the $ET_0$ calculation and measurement process of each month and forecast process of certainty and uncertainty of the RBF in the modeling period and the forecast period, and please refer to Table 2 for prediction accuracy.

TABLE 2

Monthly Prediction Accuracy Evaluation of CU-RBF and RBF

| | Modeling Period (2013-2015) | | Prediction Period (2016-2018) | |
|---|---|---|---|---|
| Parameter | RBF | CU-RBF | RBF | CU-RBF |
| Mean(mm) | 91.28 | 92.18 | 88.98 | 91.05 |
| R² | 0.87 | 0.94 | 0.89 | 0.97 |
| NSE | 0.88 | 0.97 | 0.90 | 0.99 |
| RMSE(mm) | 50.91 | 47.28 | 46.27 | 38.43 |
| MAE(mm) | 1.41 | 1.31 | 1.29 | 1.07 |
| RE (%) | 6.69 | 1.33 | 3.34 | −0.02 |

Figure 3A:
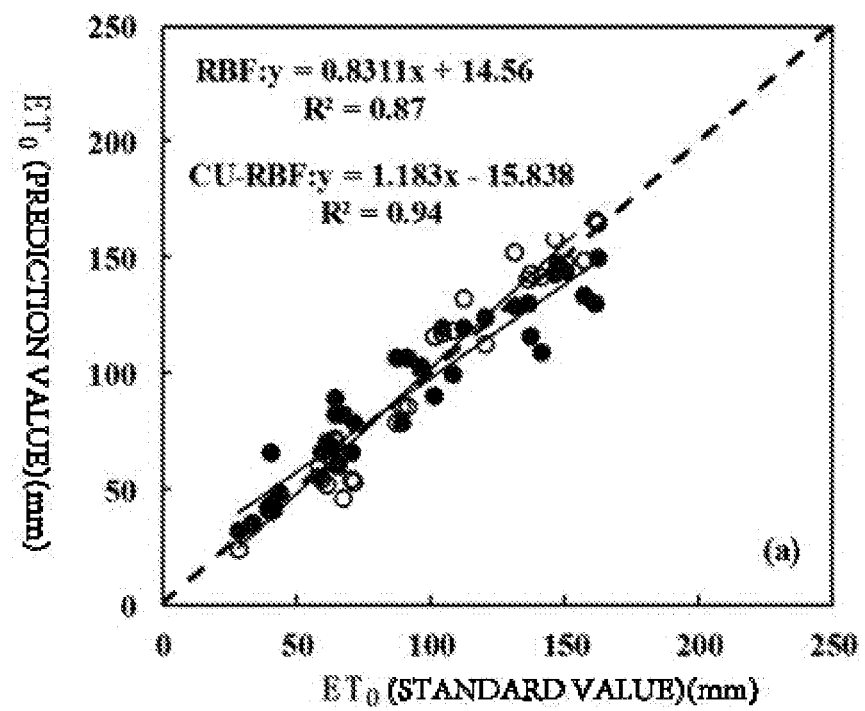
Figure 4A:
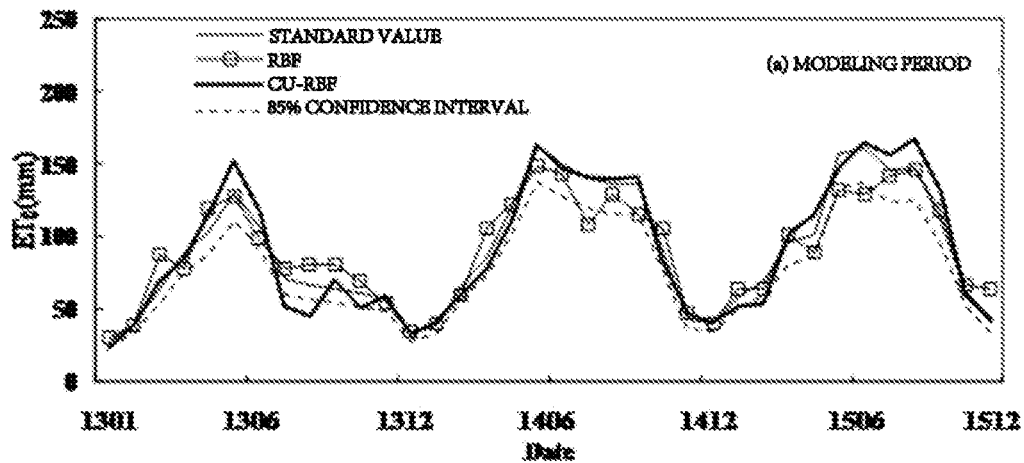

It can be seen from FIGS. 3(a) and 4(a) and Table 2 that a decision coefficient R² of correlation of a prediction value of a $ET_0$ prediction model established without considering the uncertainty of meteorological factors in the modeling period (2013-2015) and the prediction period (2016-2018) and a standard value calculated based on the Penman equation is respectively 0.87 and 0.89, a fitted regression coefficient is respectively 0.83 and 0.81, and a Nash coefficient is respectively 0.88 and 0.93.

A trend of $ET_0$ obtained through prediction of an RBF certainty model is substantially the same as that of a standard value calculated by a PM model, a monthly mean value is respectively 91.28 mm and 88.98 mm, a root mean square error RMSE and a mean absolute error MAE are respectively 50.91 mm, 46.27 mm and 1.41 mm, 1.29 mm; and a mean relative error is respectively 6.99% and 3.34%.

Figure 3B:
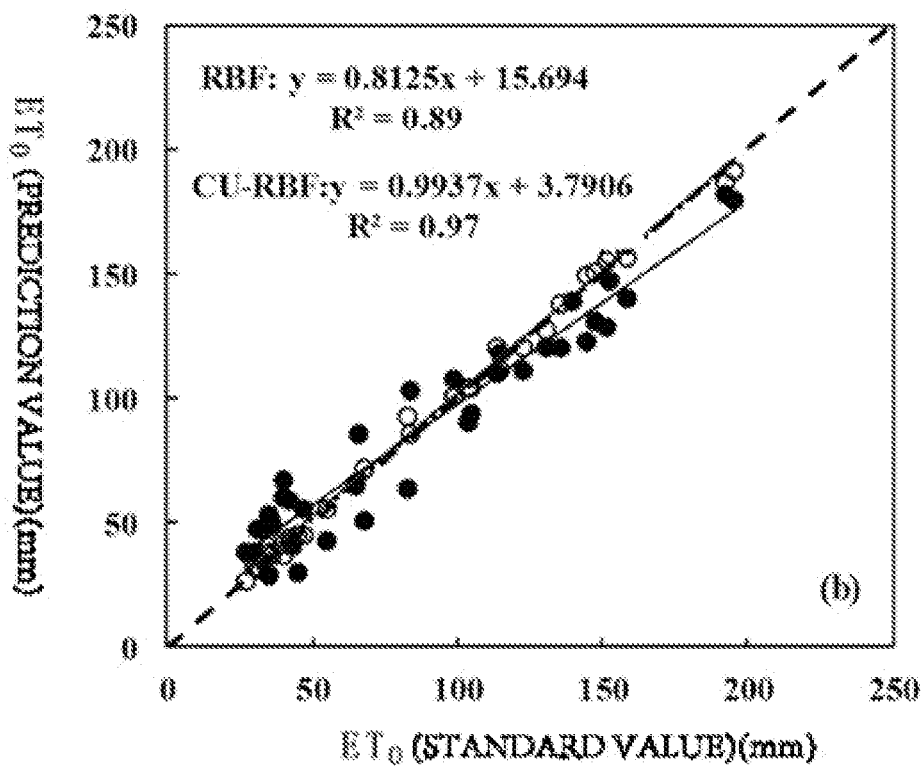
Figure 4B:
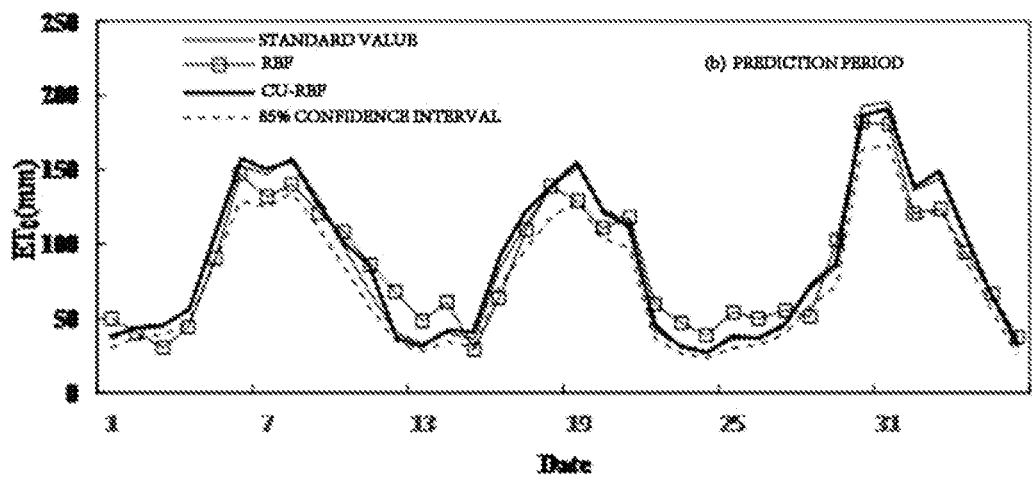

It can be seen from FIGS. 3(b) and 4(b) and Table 2 that the decision coefficient of correlation of a prediction value of a $ET_0$ probability prediction model (CU-RBF) established considering the uncertainty of meteorological factors in the modeling period and the prediction period and the standard value calculated based on the Penman equation is respectively 0.94 and 0.97, a fitted regression coefficient is respectively 1.18 and 0.99, and a Nash coefficient is respectively 0.90 and 0.99.

A trend of $ET_0$ obtained through prediction of a CU-RBF certainty model is substantially the same as that of the standard value calculated by the PM model, a monthly mean value is respectively 92.18 mm and 91.05 mm, a root mean square error RMSE and a mean absolute error MAE are respectively 47.28 mm, 38.43 mm and 1.31 mm, 1.07 mm; and a mean relative error is respectively 1.33% and −0.02%.

It can be known according to the above analysis that in both the simulation period and prediction period, $ET_0$ predicted by the CU-RBF model and $R^2$ and NSE of the standard value all are improved, and RMSE, MAE and RE all are decreased. $R^2$ and NSE are respectively increased by 0.07, 0.08 and 0.09, 0.06, and RMSE, MAE and RE are respectively decreased by 3.36 mm, 7.84 mm, 0.1 mm and 0.22 mm, 5.36%, 3.36%. Moreover, the CU-RBF can give 85% confidence interval of the forecast value, wherein a proportion of the standard value $ET_0$ contained in the specified probability interval is higher.

What is claimed is:

1. A farmland reference crop evapotranspiration prediction method considering uncertainty of meteorological factors, comprising:
   S1. acquiring a plurality of groups of weather forecast data of a prediction region within a preset time period;
   S2. inputting the plurality of groups of weather forecast data into a Bayesian probability forecast system to obtain a plurality of groups of corrected weather forecast data; and
   S3. inputting the plurality of groups of corrected weather forecast data into a trained radial basis function (RBF) neural network, and predicting to obtain a farmland reference crop evapotranspiration,
   wherein a training method of a RBF neural network comprises:
      A1. selecting a plurality of groups of past weather data, and adopting Penman equation to calculate a first reference crop evapotranspiration within a time corresponding to each of the plurality of groups of past weather data;
      A2. adopting the plurality of groups of past weather data and the first reference crop evapotranspiration as inputs and outputs of the RBF neural network, respectively, and training the RBF neural network to obtain an initial RBF neural network model;
      A3. acquiring a plurality of groups of past weather forecast data, and adopting the Penman equation to calculate a second reference crop evapotranspiration within a time corresponding to each of the plurality of groups of past weather forecast data;
      A4. inputting the plurality of groups of weather forecast data in step A3 into the Bayesian probability forecast system to obtain corrected weather forecast data; and
      A5. adopting the corrected weather forecast data in step A4 and the second reference crop evapotranspiration as inputs and outputs of the initial RBF neural network model, respectively, and training the initial RBF neural network model to obtain the trained RBF neural network.

2. The farmland reference crop evapotranspiration prediction method of claim 1, wherein an RBF of the RBF neural network is as follows:

$$F(X) = \sum_{k=1}^{q} w_k \varphi_k \|X - c_k\|;$$

$$\varphi(X) = \exp\left(-\frac{X^2}{\delta^2}\right);$$

wherein, q is a number of nodes of hidden layers, and shows an input sample size; $w_k$ is a weight factor from each node of the hidden layers to an output layer F(k); $c_k$ is a center value of a $k^{th}$ RBF; $\delta$ is a variable of the RBF; $\varphi$ is a reversible Gaussian function; $X=(x_1, x_2, x_3, x_4)$ is weather forecast data/past weather data, wherein $x_1$ is a maximum temperature, $x_2$ is a minimum temperature, $x_3$ is an average relative humidity; and $x_4$ is an average relative wind speed.

3. The farmland reference crop evapotranspiration prediction method of claim 2, wherein the RBF neural network is constructed through an RBF toolbox of MATLAB, and a call format of a specific function is as follows:

net=newrb(P,T,goal,spread,MN,DF);

wherein P and T are input and output variables, respectively; goal is a mean square error, and goal=0.001; spread is a width of the RBF; MN is a maximum number of neurons during an ANN learning process; and DF is a number of neurons added between two displays.

4. The farmland reference crop evapotranspiration prediction method of claim 1, wherein the Penman equation is:

$$[\![ET]\!]\_0 = (0.408 \times \Delta \times (Rn-G) + \gamma \times 900/(T\_mean+273) \times u\_2 \times (e\_s-e\_a))/(\Delta + \gamma \times (1+0.34 \times u\_2));$$

wherein $ET_0$ is a reference crop evapotranspiration; $\Delta$ is a slope of a saturated water vapor pressure curve; Rn is a surface net radiation; G is a soil heat flux; $\gamma$ is a psychrometric constant; $T_{mean}$ is a daily average temperature on a date of each group of the plurality of groups of weather forecast data; $u_2$ and $e_a$ are a wind speed at a height of 2 meters and an actual water vapor pressure within a time corresponding to each group of the plurality of groups of weather forecast data, respectively; and $e_s$ is a saturated water vapor pressure.

5. The farmland reference crop evapotranspiration prediction method of claim 1, wherein a method of correcting weather forecast data of the Bayesian probability forecast system comprises:
   B1. calculating a prior variance of the weather forecast data, and adopting the prior variance as a diagonal element of an initial covariance matrix of the weather forecast data;
   B2. calculating a covariance matrix of the weather forecast data according to the initial covariance matrix as follows:

$$C_i = \begin{cases} C_0 & i \leq t_0 \\ s_d(\text{Cov}(X_0, X_1, \ldots X_{i-1}) + s_d \varepsilon I_d) & i > t_0 \end{cases};$$

$$C_{i+1} = \frac{i-1}{i} C_i + \frac{s_d}{i} \left( \overline{iX_{i-1}X_{i-1}^T} - (i+1)\overline{X_i X_i^T} + X_i X_i^T + \varepsilon I_d \right);$$

wherein, $C_0$ is the initial covariance matrix and a diagonal matrix; $\varepsilon$ is a positive number between 0 and 1; $s_d$ is a scale factor having a value of $2.4^2/d$; d is a dimension of the covariance matrix; $I_d$ is a d-dimensional identity matrix; $t_0$ is initial sampling frequency; X is the weather forecast data, $x_1$ is a maximum temperature, $x_2$ is a minimum temperature, $x_3$ is an average relative humidity; $x_4$ is an average relative wind speed;

$X_0$, $X_1$, $X_i$ and $X_{i+1}$ are the weather forecast data at $0^{th}$, $1^{st}$, $i^{th}$ and $i+1^{th}$ iterations, an initial value of i is 0; $Cov(\cdot)$ is the covariance matrix; and $\overline{X_{i-1}}$ $\overline{X_i}$ are mean values of the weather forecast data obtained through first i−1 and i iterations, and $X_i^T$ is a transpose of $X_i$;

B3. generating a new sample $X_i^*$ from a posterior density $N(X_i, C_i)$ of the weather forecast data, and calculating an acceptance probability α of the new sample $X_i^*$ as follows:

$$\alpha = \min\left\{1, \frac{f(S_n \mid X_i^*)g(X_i^*)}{f(S_n \mid X_i)g(X_i)}\right\};$$

wherein $S_n$ is a reference crop evapotranspiration; $f(S_n|X_i^*)$ is a likelihood function of $X_i^*$; $g(X_i^*)$ is a prior density of $X_i^*$; $g(X_i)$ is a prior density of $X_i$;

B4. randomly selecting a uniform random number between 0 and 1; updating $X_{i+1}=X_i^*$ if the uniform random number is less than the acceptance probability of the new sample $X_i^*$; and letting $X_{i+1}=X_i$ if the uniform random number is not less than the acceptance probability; and B5. determining whether $X_{i+1}$ reaching a preset precision is generated; if $X_{i+1}$ reaching the preset precision is generated, outputting $X_{i+1}$ as the corrected weather forecast data; and if $X_{i+1}$ reaching the preset precision is not generated, letting i=i+1 and returning to step B2.

* * * * *